(12) United States Patent
Stauder et al.

(10) Patent No.: US 7,730,004 B2
(45) Date of Patent: Jun. 1, 2010

(54) METHOD AND DEVICE TO DETERMINE A DESCRIPTOR FOR A SIGNAL REPRESENTING A MULTIMEDIA ITEM, DEVICE FOR RETRIEVING ITEMS IN A DATABASE, DEVICE FOR CLASSIFICATION OF MULTIMEDIA ITEMS IN A DATABASE

(75) Inventors: Jürgen Stauder, Montreuil sur Ille (FR);
Joel Sirot, Montreuil sur Ille (FR);
Jean-Emile Maria-Alphonse, Jouy le Moutier (FR)

(73) Assignee: Thomson Licensing, Boulogne-Billancourt (FR)

( * ) Notice: Subject to any disclaimer, the term of this patent is extended or adjusted under 35 U.S.C. 154(b) by 543 days.

(21) Appl. No.: 11/821,436

(22) Filed: Jun. 22, 2007

(65) Prior Publication Data
US 2008/0086510 A1 Apr. 10, 2008

(30) Foreign Application Priority Data
Jun. 22, 2006 (EP) .................................. 06300714

(51) Int. Cl.
*G06G 1/14* (2006.01)
(52) U.S. Cl. ........................................................ 706/22
(58) Field of Classification Search .................. 706/22; 707/3; 382/167
See application file for complete search history.

(56) References Cited

U.S. PATENT DOCUMENTS

2005/0216935 A1* 9/2005 Nishikawa et al. ............. 725/37
2007/0220162 A1* 9/2007 Levin et al. .................. 709/231
2007/0244870 A1* 10/2007 Laurent et al. .................. 707/3

OTHER PUBLICATIONS

Search Report Dated Nov. 24, 2006.
Jianmin Jiang et al: "Robust-to-rotation texture descriptor for image retrieval in wavelets domain" Database Inspec [Online] The Institution of Electrical Engineers, Stevenage, GB; Jan. 2006, XP002409019.
Kachouie N N et al: Optimized multichannel filter bank with flat frequency response for texture segmentation: Database Inspec [Online] The Institution of Electrical Engineers, Stevenage, GB; Jul. 21, 2005 XP002409020.
URL: HTTP://WWW.chiariglione.org/mpeg/stand_ards/mpeg-7/mpeg.-7htm#E11E3> Oct. 2004 XP002408940.
Lakshmanan V: "A Separable Filter for Directional Smoothing" database inspect [Online] The Institution of Electrical Engineers, Stevenage, GB; Jul. 2004, XP002409021.

* cited by examiner

*Primary Examiner*—David R Vincent
(74) *Attorney, Agent, or Firm*—Robert D. Shedd; Jeffrey M. Navon

(57) ABSTRACT

The invention concerns a method and a device to determine a descriptor for a signal representing a multimedia item. The method comprises the step of applying to said signal a first bank of directional filters in order to obtain a first set of coefficients. According to the invention the method comprises the steps of:
applying to said signal a second bank of filters in order to obtain a second set of coefficients representing the low-pass filtered signal,
calculating a descriptor representing said multimedia element by making the difference between said first set of coefficients and said second set of coefficients and calculating associated power of said difference.

Application to the classification and retrieval of multimedia items.

20 Claims, 3 Drawing Sheets

METHOD AND DEVICE TO DETERMINE A DESCRIPTOR FOR A SIGNAL REPRESENTING A MULTIMEDIA ITEM, DEVICE FOR RETRIEVING ITEMS IN A DATABASE, DEVICE FOR CLASSIFICATION OF MULTIMEDIA ITEMS IN A DATABASE

This application claims the benefit, under 35 U.S.C. §119 of European Patent Application 06300714.0 filed Jun. 22, 2006.

FIELD OF THE INVENTION

The invention concerns a method and a device to determine a descriptor for a multimedia item. The invention concerns also a device for retrieving multimedia items in a database and a device for classification of multimedia items in a database.

BACKGROUND OF THE INVENTION

In various fields of signal and data processing, e.g. in multimedia asset management, small-sized, compact descriptors are calculated for multimedia items in order to compare two items or to search items in a database similar to a given item.

For instance, images in a database—e.g. personal photographs or images from a video—may have associated descriptors to ease database organization into groups of similar images and retrieval of images similar to a given one.

A problem of descriptors is that they should best reflect similarity of two items while being small-sized.

One type of known and commonly used descriptors is based on a frequency decomposition of the signal of the multimedia item. Therefore, a bank of filters is used to generate each a filtered signal corresponding to a frequency band. Then, often the power of the filtered signals in each band is calculated. The totality of power values builds the descriptor. The use of filter banks is common for example in audio processing. Also for images, filter banks such as wavelets or Gabor filter banks are widely used in image analysis and retrieval.

In order to enhance the capacity of a descriptor to reflect the characteristics of images and the similarity of images, one of the following measures is commonly applied:

1. The number of filters in increased;
2. The repartition and type of filters is optimised;
3. The precision of each filter is increased.

The first measure can be realised for example by taking 12 instead of 8 filters. By this, the signal's frequency spectrum is better described.

The second measure can be realised—in the case of images—by replacing wavelet filters by Gabor filters. While wavelet filters cover the 2-dimensional frequency spectrum by considering horizontal, vertical and diagonal frequencies, Gabor filters are more flexible and can describe frequencies in more directions. Hereby, the images, and notably the texture in images, can be better described.

The third measure addresses the implementation of filters, notably digital filters, and can be realized by increasing the number of samples used to represent the filter kernel. For example, a Gabor filter can be enhanced when replacing a 16×16 kernel by a 32×32 kernel.

A problem of filter banks is often, that the spectrums of filters overlap and thus the frequency bands are not properly calculated. For example, Gabor filters have Gaussian-shaped spectra. These spectra do inherently overlap. This overlap lowers performance of image retrieval notably when one or several filters include considerable parts of frequency zero.

Let us take as an example two images showing stripes. Direction and frequency of stripes is identical in both images. The only difference is a spatially constant offset between both images. We calculate a descriptor for each image based on the power of Gabor subbands. Even if the images show the same type of texture, the descriptors will be the more different the higher the offset is.

Let us take another example of two images showing the same scene at different daytimes. The more different the illumination is the more different the descriptors will be. For example, images showing cars are searched in a database using a given image showing a car at daytime. Then, images showing cars at lower light levels such as in the evening may not be found.

This effect makes the performance of retrieval in databases more difficult, notably when semantically similar items are searched. For example, audio clips are searched having a similar rhythm to a given one. When audio clips have different signal offsets by technical reasons, some audio clips with same rhythm but different offset may not be found.

A negative effect can also occur when descriptors based on filter banks are used to classify multimedia items. Hereby, the descriptor is fed into a classifier that attributes one or several labels to the image. For example, a classifier for outdoor scenes in images can detect an outdoor scene in a given image and generate the label "outdoor" for this image. A classifier is usually trained by a set of typical images. When these images include only daylight images, the classifier may not detect outdoor scenes with lower light level, for example in the morning.

SUMMARY OF THE INVENTION

The invention proposes a method to calculate the descriptors of multimedia items by using bank filters and avoiding at least one of the above mentioned drawbacks.

To this end, the invention proposes a method to determine a descriptor for a signal representing a multimedia item comprising the step of applying to the signal a first bank of directional filters in order to obtain a first set of coefficients.

According to the invention, the method comprises the steps of:

applying to the signal a second bank of filters in order to obtain a second set of coefficients representing the low-pass filtered signal, calculating a descriptor representing said multimedia element by making the difference between the first set of coefficients and the second set of coefficients and calculating associated power of the difference.

According to a preferred embodiment, the directional filters are Gabor type filters.

According to a preferred embodiment, the second bank of filters consist in low-pass filters.

According to a second embodiment, the second bank of filters consists in directional filters which calculate the means along a line lying vertically to the direction of the sensitivity of the Gabor filters.

Preferentially, the calculation of associated power of the difference is done on quadratic groups of coefficients, the obtained descriptor being a set of values, each value corresponding to the one obtained for each group.

According to another embodiment, the calculation of associated power of said difference is done on the whole descriptors, said obtained descriptor being a unique value.

Preferentially, the coefficients in the first set and in the second set of coefficients correspond each to one direction and to one scale of the filter.

The invention concerns also a device for determining a descriptor for a signal representing a multimedia item comprising means for applying to said signal a first bank of directional filters in order to obtain a first set of coefficients. According to the invention, the device comprises:

means for applying to said signal a second bank of filters in order to obtain a second set of coefficients representing the means of said signal, means for calculating a descriptor representing said multimedia element by making the difference between said first set of coefficients and said second set of coefficients and calculating associated power of said difference.

According to a second aspect, the invention concerns a device for retrieving multimedia items in a database. According to this aspect, the device comprises a device for determining a descriptor according to the invention, means for comparing descriptors of a sample image and descriptors of images of said database, means for retrieving images of said database which difference of descriptors with said sample image is lower than a predetermined threshold.

According to a third aspect, the invention concerns also a device for classification of multimedia items in a database. According to this third aspect, the device comprises also a device for determining a descriptor according to the invention, clustering means for classification of said descriptors.

BRIEF DESCRIPTION OF THE DRAWINGS

Other characteristics and advantages of the invention will appear through the description of a non-limiting embodiment of the invention, which will be illustrated, with the help of the enclosed drawing.

DETAILED DESCRIPTION OF PREFERRED EMBODIMENTS

Figure 1:
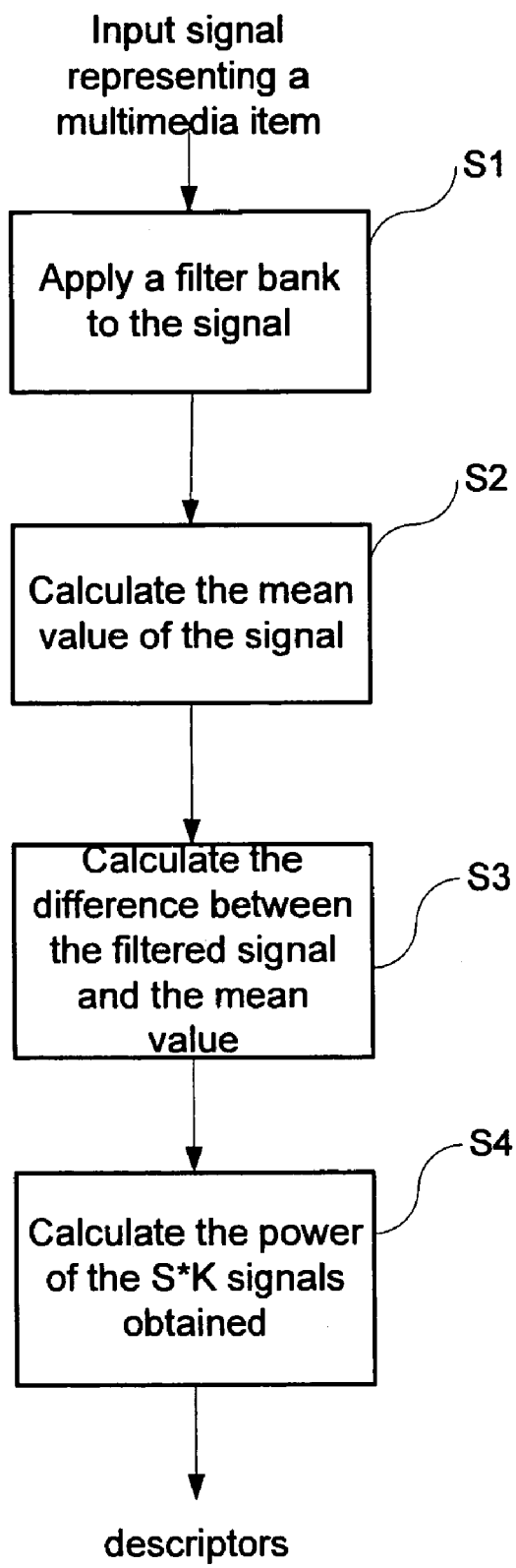
FIG. 1 represents a flow-chart of an embodiment of the invention.

Embodiments of the present invention may be implemented in software, firmware, hardware or by any combination of various techniques. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware component that contain hardwired logic for performing the steps, or by any combination of programmed computer components and custom hardware components.

Thus, a machine-readable medium may include any mechanism for storing or transmitting information in a form readable by a machine (for instance a computer). These mechanisms include, but are not limited to, floppy diskettes, optical disks, hard disk drives, holographic disks, compact disks read-only memory (CD-ROMs), magneto-optical disks, read-only memory (ROMs), random access memory (RAM), Erasable Programmable Read-only memory (EE-PROM), magnetic or optical cards, and/or a flash memory.

Unless specifically stated otherwise as apparent from the following discussion, it is appreciated that discussions utilizing terms such as "processing" or "computing" or "calculating" or "determining" or the like, may refer to the action and processes of a computer system, or similar electronic computing device, that manipulates and transforms data represented as physical quantities within the computer system memories or registers or other such information storage, transmission or display devices.

In the following detailed description of the embodiments, reference is made to the accompanying drawings that show, by way of illustration, specific embodiments in which the invention may be practices. In the drawings, like numeral describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments.

FIG. 1 represents a flow-chart of an embodiment of the invention.

In a step S1, a filter bank is applied to the signal representing the multimedia item.

To capture the texture in images for database indexing and image retrieval, steered (or directional) filters are often used that express the degree of detail in several directions, for example vertically and horizontally. Among the steered filters, the Gabor filter is known for his good indexing efficiency.

According to the preferred embodiment described here, the filter bank is based on Gabor type filters. Other filters such as Hermite filters or general Gaussian filters may be used. A Gabor filter is defined according to the following formula:

$$g(x, y) = \frac{1}{2\pi\sigma_x\sigma_y}\exp\left[-\frac{1}{2}\left(\frac{x^2}{\sigma_x^2} + \frac{y^2}{\sigma_y^2}\right) + 2\pi j W x\right]$$

$\sigma_x$, $\sigma_y$ are the standard deviations in x and y direction of the Gaussian kernel of the Gabor filter, Wx is a frequency shift in x direction and x, y represent the pixel coordinates.

The Fourier transform of this equation being:

$$G(u, v) = \exp\left[-\frac{1}{2}\left(\frac{(u - W)^2}{\sigma_u^2} + \frac{v^2}{\sigma_v^2}\right)\right]$$

With $$\sigma_u = \frac{1}{2\pi\sigma_x} \text{ and } \sigma_v = \frac{1}{2\pi\sigma_y}$$

and W the central frequency of the filter.

The real part of the Gabor filter is $$g_R(x, y) = \frac{1}{2\pi\sigma_x\sigma_y} \exp\left[-\frac{1}{2}\left(\frac{x^2}{\sigma_x^2} + \frac{y^2}{\sigma_y^2}\right)\right]\cos(2\pi Wx)$$

The Gabor filter bank is generated by $g_{mn}(x,y) = a^{-m} g(x',y')$ with a>1 and m,n=integer.

With m, n indicating a specific scale and a specific direction, respectively, with $x' = a^{-m}(x\cos\theta + y\sin\theta)$ and $y' = a^{-m}(-x\sin\theta + y\cos\theta)$ where $$\theta = \frac{n\pi}{K}$$

and K the total number of directions, with $0 \leq n \leq K$.

The scale is indicated by m with $0 \leq m < S$, m=0 being the base frequency band and S being the number of scales. The scale indicates the degree of detail focussed by the filter. For images, a low scale captures the overall image layout and a fine scale may capture grass and leaves.

The real part of the filter bank is $g_{Rmn}(x,y) = a^{-m} g_R(x',y')$

According to this embodiment, S=4, K=6, $U_h$=0.4, $U_l$=0.05.

$U_h$ is the highest central frequency and $U_l$ the lowest one. a is calculated according to the following formula:

$$a = \left(\frac{U_h}{U_l}\right)^{1/(S-1)} =$$

$$\sigma_u = \frac{(a-1)U_h}{(a+1)\sqrt{2\ln 2}} =$$

$$\sigma_v = \tan\left(\frac{\pi}{2K}\right)\left[U_h - 2(\ln 2)\frac{\sigma_u^2}{U_h}\right]\left[2(\ln 2) - \left(\frac{2(\ln 2)\sigma_u}{U_h}\right)^2\right]^{-1/2}$$

During step S1, the filter bank consisting of the real part of the Gabor filters is applied to the signal. One obtains S times K output signals one for each scale and for each direction.

In a step S2, K times S low-pass filters are applied to the input signal, in order to obtain a mean value of the signal in one of the K directions and according to one of the S scales.

The low pass filter applied is the following:

$$q(x, y) = \frac{1}{2\pi\sigma_x\sigma_y}\exp\left[-\frac{1}{2}\left(\frac{x^2}{(2\sigma_y)^2} + \frac{y^2}{\sigma_x^2}\right)\right]$$

And the bank of low pass filters applied is the following:

$q_{mn}(x,y) = a^{-m} q(x',y')$ with a>1 and m,n=integer m and n correspond to those of the corresponding Gabor filter. This means, the mean filters have the same direction and the same scale as the Gabor filters. In a simpler variant, the scale may be kept constant, In this case, the finest scale has to be chosen, i.e. m=S−1.

In a variation of step S2, a set of directional filters is used that calculates the means along a line lying vertically to the direction of the sensitivity of the Gabor filters.

In a step S3, a descriptor is calculated for each signal.

For calculating the descriptor, a difference between the signal filtered by the Gabor filter bank and the signal calculated by the low-pass filter bank is calculated for each pixel of the multimedia item. S times K difference images are thus obtained.

In order to obtain the descriptor, the power in each of the S.K difference signals is evaluated in a step S4.

For this purpose, the power is estimated in quadratic image blocks containing several pixels by the average of the squares of the signal values. The descriptor contains in this case the power values of all blocks.

In other embodiments, or in combination, other statistical moments, centred or uncentred moments can be used.

To calculate the power values for a block, the S times K difference images are divided into 16 quadratic image blocks. In each block k having L pixels of each of the difference images, the image pixel values are squared, summarized and divided by the number of pixels per block according to the following equation $$P_k = \frac{1}{L}\sum_{l=0}^{L-1} D_l^2$$

where D is the difference value of a Pixel and P is the resulting power value for a block.

The resulting descriptor $\{P_k / 0 \leq k < 16SK\}$ has 16 times S times K coefficients.

According to another embodiment, one estimates one power value for the whole image or calculates power values for image regions of arbitrary shape.

Figure 2:
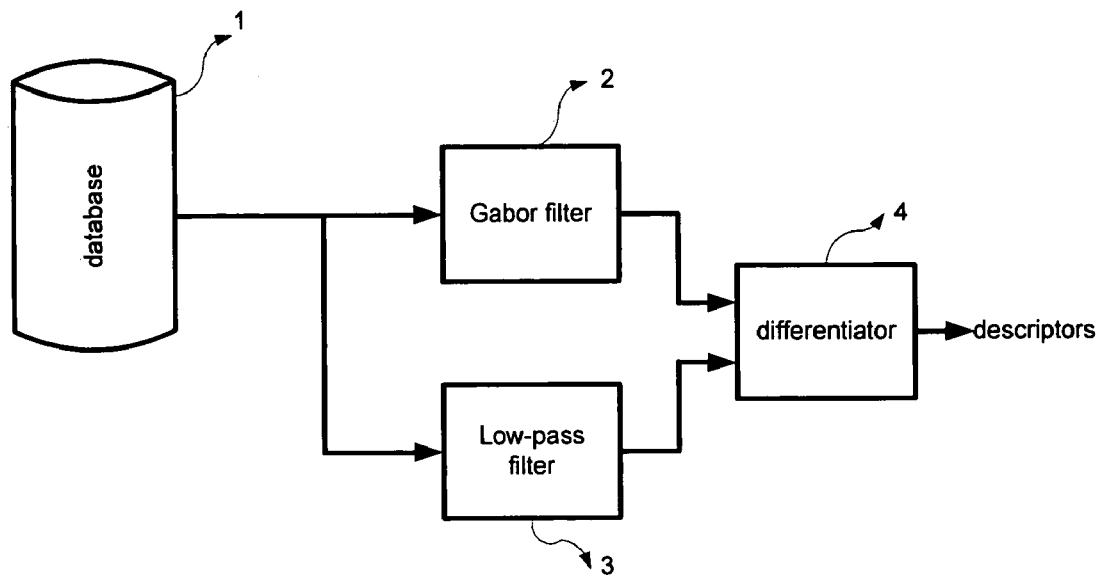
FIG. 2 represents a device according to an embodiment of the invention.

FIG. 2 shows a device according to the preferred embodiment of the invention. This device implements preferentially a method according to the invention.

To this end, the device according to the preferred embodiment comprising a Gabor filter 2, a low-pass filter 3 and a differentiator 4 receives multimedia data from a database 1.

The Gabor filter 2 and the low-pass filter 3 receive as input the multimedia data of the database 1. They calculate for each of the multimedia item a set of K*S coefficients as described above in reference to FIG. 1. A differentiator 4 calculates the difference between the coefficients calculated by the Gabor filter and the coefficients calculated by the low-pass filter as explained in reference to FIG. 1.

Figure 3:
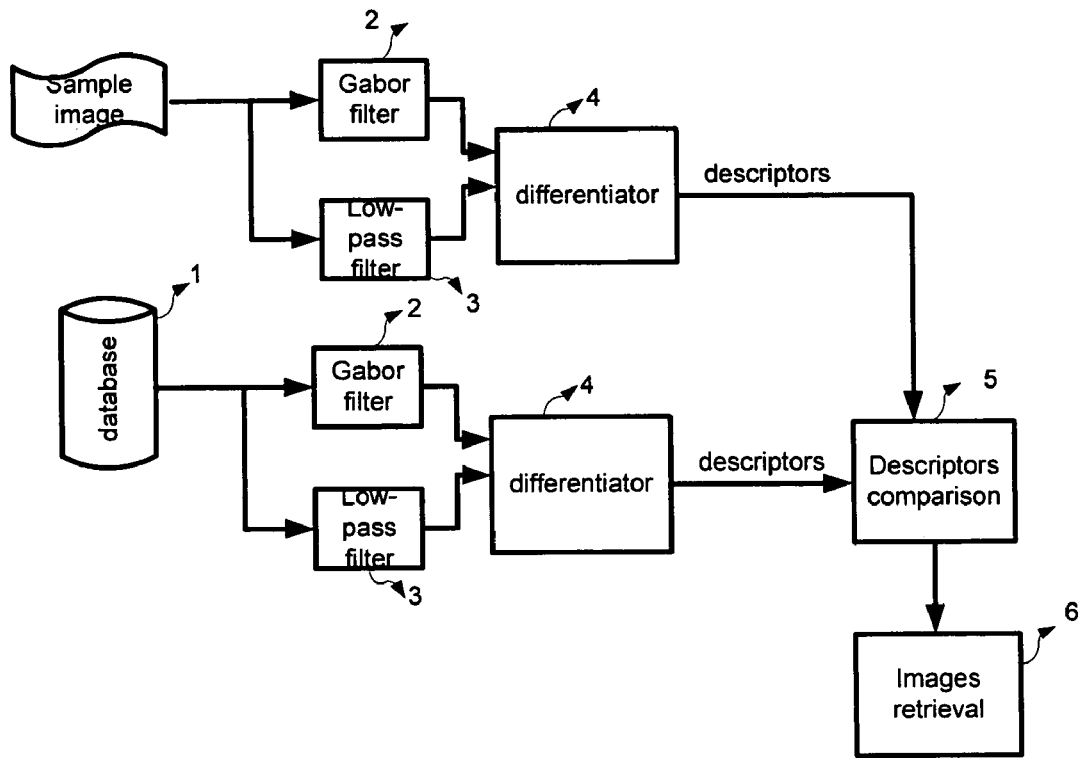
FIG. 3 represents an application of the invention to the image retrieval.

A typical application can be the search of an image in the database 1 using a sample image as query as shown on FIG. 3. In this case, the coefficients are calculated for the sample image and for the images of the database. A module 5, receiving as input the descriptors of the sample image and the descriptors of the images of the database 1 calculates the difference between the descriptors obtained for the sample image and the descriptors of each of the image of the database or of a subset of the images of the database. The descriptors consisting in a set of S*K coefficients, the difference Di for each coefficient i is calculated by the module 5. Then, the following difference between the sample image and the given image is calculated:

$$D_{TOTAL} = \sum_{i=1}^{16SK} D_i^2$$

A number of images from the database having the smallest difference are returned to the user as closest images compared to the sample image by a module 6 of images retrieval. It can be the number of images having the difference lower than a predetermined threshold. Other difference formulas according to the state of the art of image retrieval can be used.

Figure 4:
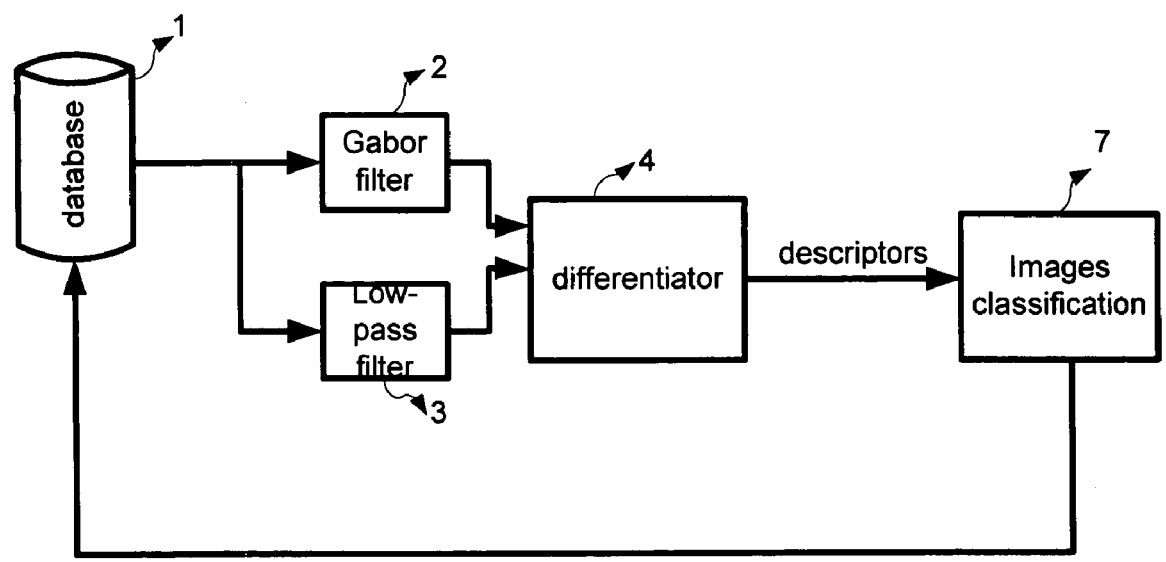
FIG. 4 represents an embodiment of the invention to the classification of multimedia elements.

On FIG. 4, the module 4 as described on FIG. 3 is connected to a module 7 of images classification.

Such a module of image classification 7 establishes a classification of the images. The images are classified according to the value of their descriptors. Images having very close values of descriptors are classified as belonging to the same category. The classification can be a clustering method such as k-means using a given number of clusters.

What is claimed is:

1. A method to determine a descriptor for a signal representing a multimedia item input to a computer comprising the step of applying to said signal a first bank of directional filters in order to obtain a first set of coefficients,
wherein it comprises the steps of
applying to said signal a second bank of directional filters in order to obtain a second set of coefficients representing the low-pass filtered signal,
calculating a descriptor representing said multimedia element by calculating the difference between said first set of coefficients and said second set of coefficients,
calculating associated power of said difference, and
outputting the descriptors in response to the calculated associated power.

2. Method according to claim 1 wherein said directional filters are Gabor type filters.

3. The method according to claim 1 wherein said second bank of filters consist of low-pass filters.

4. The method according to claim 2 wherein said second bank of filters consist of directional filters which calculate the means along a line lying vertically to the direction of the sensitivity of the Gabor filters.

5. The method according to claim 1 wherein said calculation of associated power of said difference is done on quadratic groups of coefficients, said obtained descriptor being a set of values, each value corresponding to the one obtained for each group.

6. The method according to claim 2 wherein said calculation of associated power of said difference is done on quadratic groups of coefficients, said obtained descriptor being a set of values, each value corresponding to the one obtained for each group.

7. The method according to claim 3 wherein said calculation of associated power of said difference is done on quadratic groups of coefficients, said obtained descriptor being a set of values, each value corresponding to the one obtained for each group.

8. The method according to claim 4 wherein said calculation of associated power of said difference is done on quadratic groups of coefficients, said obtained descriptor being a set of values, each value corresponding to the one obtained for each group.

9. The method according to claim 1 wherein said calculation of associated power of said difference is done on the whole descriptors, said obtained descriptor being a unique value.

10. The method according to claim 2 wherein said calculation of associated power of said difference is done on the whole descriptors, said obtained descriptor being a unique value.

11. The method according to claim 1 wherein the coefficients in the first set and in the second set of coefficients correspond each to one direction and to one scale of the filter.

12. The method according to claim 2 wherein the coefficients in the first set and in the second set of coefficients correspond each to one direction and to one scale of the filter.

13. The method according to claim 3 wherein the coefficients in the first set and in the second set of coefficients correspond each to one direction and to one scale of the filter.

14. The method according to claim 4 wherein the coefficients in the first set and in the second set of coefficients correspond each to one direction and to one scale of the filter.

15. The method according to claim 5 wherein the coefficients in the first set and in the second set of coefficients correspond each to one direction and to one scale of the filter.

16. The method according to claim 6 wherein the coefficients in the first set and in the second set of coefficients correspond each to one direction and to one scale of the filter.

17. The method according to claim 7 wherein the coefficients in the first set and in the second set of coefficients correspond each to one direction and to one scale of the filter.

18. A device for determining a descriptor for a signal representing a multimedia item comprising:
means for applying to said signal a first bank of directional filters in order to obtain a first set of coefficients,
means for applying to said signal a second bank directional of filters in order to obtain a second set of coefficients representing the means of said signal,
means for calculating a descriptor representing said multimedia element by calculating the difference between said first set of coefficients and said second set of coefficients and calculating associated power of said difference, and
means for outputting the descriptors in response to the calculated associated power.

19. A device for retrieving multimedia items in a database wherein it comprises
a device for determining a descriptor according to claim 18,
means for comparing descriptors of a sample image and descriptors of images of said database,
means for retrieving images of said database which difference of descriptors with said sample image is lower than a predetermined threshold.

20. A device for classification of multimedia items in a database wherein it comprises
a device for determining a descriptor according to claim 18,
clustering means for classification of said descriptors.

* * * * *